(12) United States Patent
Hosman et al.

(10) Patent No.: US 10,417,709 B2
(45) Date of Patent: Sep. 17, 2019

(54) MITIGATION OF LATENCY DISPARITY IN A TRANSACTION PROCESSING SYSTEM

(71) Applicant: Chicago Mercantile Exchange Inc., Chicago, IL (US)

(72) Inventors: Bernard Hosman, Amsterdam (NL); Sean Castette, Chicago, IL (US); Fred Malabre, Chicago, IL (US); Pearce Peck-Walden, Chicago, IL (US); Ari Studnitzer, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 652 days.

(21) Appl. No.: 14/991,654

(22) Filed: Jan. 8, 2016

(65) Prior Publication Data
US 2017/0046783 A1 Feb. 16, 2017

Related U.S. Application Data

(60) Provisional application No. 62/203,965, filed on Aug. 12, 2015.

(51) Int. Cl.
*G06Q 40/04* (2012.01)
*G06Q 40/06* (2012.01)
*H04L 29/06* (2006.01)

(52) U.S. Cl.
CPC ............. *G06Q 40/04* (2013.01); *G06Q 40/06* (2013.01); *H04L 67/42* (2013.01)

(58) Field of Classification Search
CPC .................................................. G06Q 40/04
(Continued)

(56) References Cited

U.S. PATENT DOCUMENTS

2012/0041894 A1 2/2012 Glodjo et al.
2013/0013487 A1 1/2013 Sellberg et al.
(Continued)

OTHER PUBLICATIONS

Extended European Search Report, from EP Application No. 16182006.3, dated Nov. 22, 2016, EP.
(Continued)

*Primary Examiner* — Lindsay M Maguire
(74) *Attorney, Agent, or Firm* — Lempia Summerfield Katz LLC

(57) ABSTRACT

Systems and methods are disclosed which match or otherwise allocate an incoming transaction with previously received but not yet fully satisfied transactions counter thereto as well as to mitigation of disparities in latencies between the client devices of the market participants and the electronic data transaction processing system which may result in disparities in the time of receipt of competing transactions. The disclosed embodiments may mitigate such disparities by buffering or otherwise grouping temporally proximate competing transactions together upon receipt, e.g. into a group, collection, set, bucket, etc., and subsequently arbitrating among those grouped competing transactions, in a manner other than solely based on the order in which the competing transactions in the group were received, to determine the order in which those competing transactions will be processed, thereby equalizing priority of transactions received from participants having varying abilities to rapidly submit transactions or otherwise capitalize on transactional opportunities.

20 Claims, 4 Drawing Sheets

(58) Field of Classification Search
USPC .......................................................... 705/37
See application file for complete search history.

(56) References Cited

U.S. PATENT DOCUMENTS

| | | |
|---|---|---|
| 2015/0073970 A1 † | 3/2015 | Merold |
| 2015/0127516 A1 | 5/2015 | Studnitzer et al. |
| 2015/0127519 A1 † | 5/2015 | Melton |
| 2017/0024820 A1 † | 1/2017 | Djurdjevic |

OTHER PUBLICATIONS

Examination Report from European Application No. 16182006.3, dated Dec. 14, 2018, EP.

† cited by third party

MITIGATION OF LATENCY DISPARITY IN A TRANSACTION PROCESSING SYSTEM

REFERENCE TO RELATED APPLICATIONS

This application claims the benefit of the filing date under 35 U.S.C. § 119(e) of U.S. Provisional Application Ser. No. 62/203,965 filed Aug. 12, 2015, which is hereby incorporated by reference.

BACKGROUND

A financial instrument trading system, such as a futures exchange, referred to herein also as an "Exchange", such as the Chicago Mercantile Exchange Inc. (CME), is an electronic data transaction processing system which implements or otherwise provides, via the processing of electronic data transaction request messages, a contract market where financial products/instruments, for example futures and options on futures, are traded.

Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time, referred to as the expiration date or expiration month. An option is the right, but not the obligation, to sell or buy the underlying instrument (in this case, a futures contract) at a specified price within a specified time. The commodity to be delivered in fulfillment of the contract, or alternatively, the commodity, or other instrument/asset, for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract price.

Typically, the electronic data transaction processing system of an Exchange implements or otherwise provides for a centralized "clearing house" through which all trades made must be confirmed, matched, and settled each day until offset or delivered. The clearing house is an adjunct to the Exchange, and may be an operating division thereof, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. This process further enables anonymity between those buyers and sellers. A clearing member is a firm qualified to clear trades through the Clearing House.

Current electronic data transaction processing systems which implement financial instrument trading systems allow traders to submit orders and receive confirmations, market data, and other information electronically from client devices via a network. These "electronic" marketplaces have largely supplanted the pit based trading systems whereby the traders, or their representatives, all physically stand in a designated location, i.e. a trading pit, and trade with each other via oral and hand based communication. In contrast to the pit based trading system where like-minded buyers and sellers can readily find each other to trade, electronic marketplaces must electronically "match" the orders placed by buyers and sellers on behalf thereof. Electronic trading systems may offer a more efficient and transparent system of trading. For example, in pit trading, subjective elements and limits on human interaction may influence the process by which buyers and sellers come together to trade or otherwise limit the trading opportunities, limiting market liquidity. In contrast, an electronic exchange may be more objective when matching up a buyer and seller, relying solely on objective factors such as offer-price and time of order receipt/placement, etc. As such, electronic trading systems may achieve more fair and equitable matching among traders as well as identify more opportunities to trade, thereby improving market liquidity.

DETAILED DESCRIPTION

Figure 1:
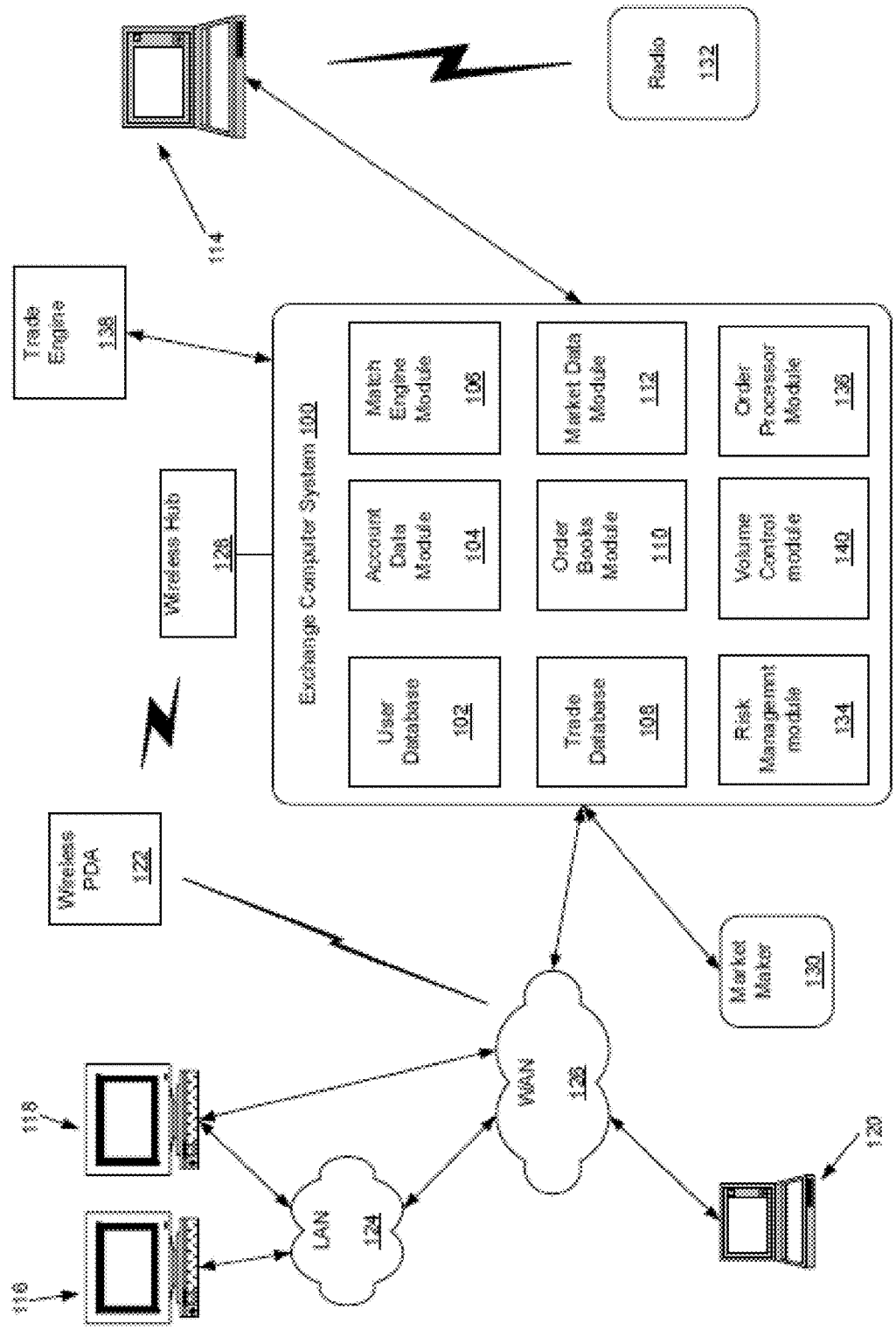
FIG. 1 depicts an illustrative computer network system that may be used to implement aspects of the disclosed embodiments.

The disclosed embodiments relate to systems and methods which match or otherwise allocate, e.g., automatically, an incoming transaction, i.e., order to trade, with "resting," i.e. previously received but not yet matched (fully satisfied), transactions counter thereto, recognizing that the algorithm or rules by which the incoming transaction is matched/allocated may impact the expectations of the participants and affect the operation of the system, e.g. of a market for a financial product being transacted. In particular, the disclosed embodiments relate to mitigation of disparities in the latencies between the client devices of the market participants and the electronic data transaction processing system which may result in disparities in the time of receipt of competing transactions. The disclosed embodiments may mitigate such disparities by buffering or otherwise grouping or collecting, e.g. into a bucket, group, set, or other collection, e.g., automatically, temporally proximate competing transactions together as they are received and subsequently arbitrating, e.g., automatically, among those grouped competing transactions, in a manner other than solely based on the order in which the competing transactions in the group were received, e.g. using a secondary order parameter, such as a secondary/reservation price, provided with each grouped transaction by the submitting participant, to determine the order in which those competing transactions will be processed and thereby equalizing priority of transactions received from participants having varying abilities, e.g. technical capability, to rapidly submit transactions or otherwise capitalize on transactional opportunities.

As will be discussed, the grouping of incoming transactions may be continuous, i.e. as one group is closed another opens and groups comprising singular non-competing transactions may be immediately transacted, thereby maintaining continuous trading. Further, by grouping incoming transactions within a defined interval, as discussed below in more detail, the participants, by virtue of their responsiveness or lack thereof to opportunities, effectively define level of competition for available opportunities. Furthermore, delay by any one participant in submitting a transaction in order to capitalize upon an opportunity, such as to observer the actions of other participants, is dis-incentivized as, there is advantage to later participation and there is risk in missing out on the opportunity.

The disclosed embodiments further feature logic which enables trading venues to supplement their regular matching model by dynamically triggered resolutions to micro shocks in supply of, and demand for liquidity. Its responsiveness to the market microstructure characteristics of each individual event allows this logic to seamlessly reduce the dominance of message arrival time in the trade allocation process.

While the disclosed embodiments may be discussed in relation to futures and/or options on futures trading, it will be appreciated that they may be applicable to any electronic transaction processing system where there are disparities in the latencies of electronic communications networks between the transaction processing system and the devices by which the participants therein become aware of transactional opportunities and submit competing electronic transaction requests seeking to capitalize thereon. Electronic trading systems, such as an equity, options or futures trading system, e.g., exchange, Electronic Communication Network ("ECN"), Alternative Trading System ("ATS"), or Swap Execution Facility ("SEF"), or market now available or later developed, e.g. cash, Futures, etc., as well as any instrument traded thereon, are only a few examples. However, the disclosed embodiments may be applicable to any transaction processing system where responses to centralized events, in a system which applies those responses based on order of receipt at the centralized location, are transmitted from logically and/or physically remote locations via electronic communications networks having disparate latencies resulting in receipt of those responses at the central location within a narrow temporal window where discrimination of the order of those received responses may be difficult if not impossible. For example, remote sensor networks which communicate temporally sensed data to a central collection system over a multipath network. In such cases, communicating time of transmission along with the response may be insufficient to resolve any ambiguities in time of receipt as time of transmission may not be trusted or otherwise controlled, e.g. due to heterogeneity of the remote devices, lack of synchronization, e.g. between clocks, among the remote locations, likelihood of manipulation of the time of transmission at the remote location or in transit, etc.

It will be appreciated that an electronic transaction processing system of a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, the transaction processing system of an exchange, also referred to herein as an electronic trading system, must respond to inputs, such as trade orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that transactional integrity and predictable system responses are maintained.

As was discussed above, electronic trading systems ideally attempt to offer an objective, efficient, fair and balanced market where market prices reflect a true consensus of the value of products traded among the market participants, where the intentional or unintentional influence of human interaction is minimized if not eliminated, and where arguably disproportional or inequitable advantages with respect to information access and responsiveness thereto are minimized if not eliminated.

Further, as discussed above, an exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the Exchange may further define the matching algorithm, or rules, by which incoming orders will be matched/allocated to resting orders.

Some products on an exchange are traded in an open outcry environment where the exchange provides a location for buyers and sellers to meet and negotiate a price for a quantity of a product. Other products are traded on an electronic transaction processing system (e.g., an electronic exchange), also referred to herein as a trading platform, electronic trading system, trading host or Electronic trading system, where market participants, e.g. traders, use software to send electronic data transaction request messages, e.g. orders, to the electronic trading system. The electronic data transaction request message may comprise an order which identifies the product, the quantity of the product the trader wishes to trade, a price at which the trader wishes to trade the product, and a direction or side of the order (i.e., whether the order is a bid, i.e. an offer to buy, or an ask, i.e. an offer to sell). It will be appreciated that there may be other order types or messages that traders can send including requests to modify or cancel a previously submitted order.

In particular, electronic trading of financial instruments, such as futures contracts, is conducted by market participants sending orders, such as to buy or sell one or more futures contracts, in electronic form to the Exchange such as via an electronic communications network. These electronically submitted orders to buy and sell are then matched, e.g., automatically, if possible, by the Exchange, i.e. by the Exchange's matching engine/hardware processor, to execute a trade. Outstanding (unmatched, wholly unsatisfied/unfilled or partially satisfied/filled) orders are maintained in one or more data structures or databases coupled with the hardware matching processor referred to as "order books," such orders being referred to as "resting," and the present state of the order books, and/or the changes thereto, are made visible, i.e., the availability of the resting orders for trading is advertised, to the market participants through electronic notifications/broadcasts over a communications network, referred to as market data feeds. An order book is typically maintained for each product, e.g. instrument, traded on the electronic trading system and generally defines or otherwise represents the state of the market for that product, i.e. the current prices at which the market participants are willing buy or sell that product. As such, as used herein, an order book for a product may also be referred to as a market for that product.

In the exemplary embodiments, all transactions for a particular market may be communicated over disparate electronic communications networks/paths which converge such that the transactions are ultimately received at the electronic trading system via one or more points of entry, e.g. one or more communications interfaces, at which the disclosed embodiments apply determinism, which as described may be at the point where matching occurs, e.g. at each match engine (where there may be multiple match engines, each for a given product/market, or moved away from the point where matching occurs and closer to the point where the electronic trading system first becomes "aware" of the incoming transaction, such as the point where transaction messages, e.g. orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored, e.g., automatically, into the subsequent processing, e.g. prioritization, matching, of those transactions/orders as will be described. See U.S. patent application Ser. No. 14/074,675, filed on Nov. 7, 2013, published as U.S. Patent Application Publication No. 2015/0127516 A1, entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE", incorporated by reference herein.

Upon receipt of an incoming electronic data transaction request message which specifies an order to trade in a particular financial instrument, whether for a single component financial instrument, e.g. a single futures contract, or for multiple component financial instruments, e.g. a combination contract such as a spread contract, a match engine, as will be described in detail below, will attempt, e.g., automatically, to identify a previously received but unsatisfied order counter thereto received in a prior electronic data transaction request message, i.e. for the opposite/counter transaction (buy or sell) in the same financial instrument at the same or better price (but not necessarily for the same quantity unless, for example, either order specifies a condition that it must be entirely filled or not at all). Data derived from prior received electronic data transaction request messages indicative of previously received but unsatisfied orders, i.e. orders which either did not match with a counter order when they were received by the electronic trading system or their quantity was only partially satisfied, referred to as a partial fill, are maintained, as discussed above, by the electronic trading system in an order book database/data structure to await the subsequent arrival of matching orders or the occurrence of other conditions, such as receipt of a request to cancel or modify the order, which may cause the order to be removed from the order book.

If the match engine identifies one or more suitable previously received but unsatisfied counter orders, they, and the incoming order, are matched to execute a transaction, i.e. a trade, there between to at least partially satisfy the quantities of one or both the incoming order or the identified orders which may then result in the creation of corresponding positions is a portfolio database or record therein in association with each participant in the trade. If there remains any residual unsatisfied quantity of the identified one or more orders, those orders are left on the order book with their remaining quantity to await a subsequent suitable counter order, i.e. to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with the original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the client devices of the market participants via the communications network.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Matching, which is a function typically performed by the Exchange, e.g., automatically, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

The Electronic trading system, as will be described below, monitors incoming orders received thereby and attempts, e.g., automatically, to identify, i.e., match or allocate, as will be described in more detail below, one or more previously received, but not yet matched, orders, i.e. limit orders to buy or sell a given quantity at a give price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e. a market order to buy or sell at a price for which there are currently no resting orders. In particular, if the incoming order is a bid, i.e. an offer to buy, then the identified order(s) will be an ask, i.e. an offer to sell, at a price that is identical to or lower than the bid price. Similarly, if the incoming order is an ask, i.e. an offer to sell, the identified order(s) will be a bid, i.e. an offer to buy, at a price that is identical to or higher than the offer price.

Upon identification (matching) of a contra order(s), a minimum of the quantities associated with the identified order(s) and the incoming order is matched and that quantity of each of the identified and incoming orders become two halves of a matched trade that is sent to a clearinghouse. The Electronic trading system considers each identified order in this manner until either all of the identified orders have been considered or all of the quantity associated with the incoming order has been matched, i.e. the order has been filled. If any quantity of the incoming order remains, an entry may be created in the order book database and information regarding the incoming order is recorded therein, i.e. a resting order is placed on the order book for the remaining quantity to await a subsequent incoming order counter thereto.

Traders access the markets of a electronic trading system/trading platform using trading software which operates on their client device that, via a wired and/or wireless electronic data communications network, receives and displays market data comprising at least a portion of the order book for a market, i.e. at least a portion of the currently resting orders, enables a trader to provide parameters for an order for the product traded in the market, and transmits electronic data transaction request messages comprising orders to the electronic trading system via the network. The trading software typically includes a graphical user interface to display at least a price and quantity of some of the entries in the order book associated with the market. The number of entries of the order book displayed is generally preconfigured by the trading software, limited by the Electronic trading system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be, or may operate, an electronic system that automatically analyzes incoming market data and/or other information, e.g. weather data, news events, other economic data, and automatically generates and submits electronic data transaction request messages comprising orders based thereon.

If the electronic trading system identifies that an incoming market order may be filled by a combination of multiple resting orders, e.g. the incoming order quantity meets or exceeds the sum of the quantities of one or more resting orders having the same or a better price as the incoming order, all of the resting orders having the same or better price as the incoming order will be matched and satisfied. Any excess unsatisfied quantity of the incoming order will be rested on the order book to await a suitable counter order, or cancellation/modification, etc.

Where the electronic trading system identifies multiple orders contra to the incoming order and that have a price which is favorable to the price of the incoming order, i.e. the price is equal to or better, e.g. lower if the incoming order is a buy or higher if the incoming order is a sell, than the price of the incoming order, and the quantity of the incoming order is insufficient to satisfy the total quantity of the identified resting orders, the electronic trading system may allocate, e.g., automatically, the quantity of the incoming order among such identified orders in accordance with prioritization and allocation rules/algorithms, referred to as "allocation algorithms" or "matching algorithms," as, for example, may be defined in the specification of the particular financial product or defined by the Exchange for multiple financial products.

As was noted above, an Exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g. unknown position of an order in an order book. Typically, the Exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular Exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some Electronic trading systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some electronic trading systems cap the quantity of an incoming order that is allocated to a standing order on the basis of a priority for certain markets. In addition, some electronic trading systems may give a preference to orders submitted by a trader who is designated as a market maker for the product. Other electronic trading systems may use other criteria to determine whether orders submitted by a particular trader are given a preference. Typically, when the electronic trading system allocates a quantity of an incoming order to a plurality of identified orders at the same price, the trading host allocates a quantity of the incoming order to any orders that have been given priority. The electronic trading system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.

3. Find the 'Matching order size', which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down (for example, 21.99999999 becomes 21) unless the result is less than 1, when it becomes 1.
7. If tradable volume remains when the last order in the list had been allocated to, return to step 3.
Note: The matching list is not re-sorted, even though the volume has changed. The order which originally had the largest volume is still at the beginning of the list.
8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:
1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.
7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:
1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence. Any resting order may receive multiple allocations from the various stages of the algorithm.

It will be appreciated that there may be other allocation algorithms, including combinations of algorithms, now available or later developed, which may be utilized with the disclosed embodiments, and all such algorithms are contemplated herein.

One exemplary system for matching is described in U.S. patent application Ser. No. 13/534,499, filed on Jun. 27, 2012, entitled "MULTIPLE TRADE MATCHING ALGORITHMS," published as U.S. Patent Application Publication No. 2014/0006243 A1, incorporated by reference herein, discloses an adaptive match engine which draws upon different matching algorithms, e.g. the rules which dictate how a given order should be allocated among qualifying resting orders, depending upon market conditions, to improve the operation of the market. For example, for a financial product, such as a futures contract, having a future expiration date, the match engine may match incoming orders according to one algorithm when the remaining time to expiration is above a threshold, recognizing that during this portion of the life of the contract, the market for this product is likely to have high volatility. However, as the remaining time to expiration decreases, volatility may decrease. Accordingly, when the remaining time to expiration falls below the threshold, the match engine switches to a different match algorithm which may be designed to encourage trading relative to the declining trading volatility. Thereby, by conditionally switching, e.g., automatically, among matching algorithms within the same financial product, as will be described, the disclosed match engine automatically adapts to the changing market conditions of a financial product, e.g. a limited life product, in a non-preferential manner, maintaining fair order allocation while improving market liquidity, e.g., over the life of the product.

In one implementation, this trading system may evaluate market conditions on a daily basis and, based thereon, change, e.g., automatically, the matching algorithm between daily trading sessions, i.e. when the market is closed, such that when the market reopens, a new trading algorithm is in effect for the particular product. As will be described, the disclosed embodiments may facilitate more frequent changes to the matching algorithms so as to dynamically adapt to changing market conditions, e.g. intra-day changes, and even intra-order matching changes. It will be further appreciated that hybrid matching algorithms, which match part of an order using one algorithm and another part of the order using a different algorithm, may also be used.

With respect to incoming orders, some traders, such as automated and/or algorithmic traders, attempt to respond to market events, such as to capitalize upon a mispriced resting order or other market inefficiency, as quickly as possible. It will be appreciated that there maybe at least three parts to this ability to respond, the latency in receipt of data indicative of an opportunity, the latency is computing or otherwise generating a response thereto, and the latency in communicating that response to the electronic trading system to capitalize on the opportunity. This may result in penalizing the trader who makes an errant trade, or whose underlying trading motivations have changed, and who cannot otherwise modify or cancel their order faster than other traders can submit trades there against.

It may considered that an electronic trading system that rewards the trader who submits their order first creates a potential advantage to those trader which happen to have access to lower latency devices and/or connections or otherwise creates an incentive to take advantage of disparities in the latencies of the communications networks which connect the client devices of the market participants with the electronic trading system, and/or the disparate latencies of those devices in responding to opportunities, by: exploiting existing inequities in those latencies, e.g. investing substantial capital in lower latency proprietary client devices and/or communications networks, e.g. using faster technology and/or closer proximity to the electronic trading system, etc.; participating in the market substantially to capitalize on opportunities (aggressor side/lower risk trading) as opposed to creating new opportunities (market making/higher risk trading); modifying existing systems to streamline business logic at the cost of trade quality; and/or reducing one's activities and exposure in the market. The result may be a lesser quality market and/or reduced transaction volume due to shifting of capital from trading to infrastructure investment, and corresponding thereto, reduced fees to the Exchange.

The disclosed embodiments may attempt to automatically regulate incoming orders or otherwise equalize the rate at which incoming orders are processed upon receipt to, for example, reduce, but not eliminate, the impact of minor discrepancies in response latency. Incoming orders, once equalized, are then allocated, e.g., automatically, for matching in a manner which may incentivize desired behavior. The disclosed embodiments may incentivize market making behavior over aggressor behavior to improve and maintain market liquidity or health by, for example, reducing penalties for providing liquidity, e.g. providing new or additional transactional opportunities, and incentivizing submission of orders which reflect the true intent of the market participant, or at least a close approximation thereof, even if that intent is to leverage anomalies or inefficiencies in the operations of market or the electronic trading system. Furthermore, by reducing the incentive to invest in faster trading systems, the cost of which may exponentially increase with respect to linear improvements therein, market participants can devote more capital to investment and market participation. In addition, by not eliminating the benefit of speed altogether, speedy order submission may be rewarded where it improves market liquidity/health. See U.S. patent application Ser. No. 14/644,460, filed on Mar. 11, 2015, published as U.S. Patent Application Publication No. 20150262297, entitled "IMPROVED MARKET OPERATION THROUGH REGULATION OF INCOMING ORDER MATCH ALLOCATION AND/OR DYNAMIC RESTING ORDER MATCH ALLOCATION PRIORITIES", incorporated by reference herein.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata. While the disclosed embodiments will be described with respect to a matching processor 106 which implements a FIFO matching algorithm, it will be appreciated that the described matching processor 106 may use other matching algorithms, such as pro-rata or combinations of FIFO or pro-rata. See U.S. patent application Ser. No. 14/644,525, filed on Mar. 11, 2015, published as U.S. Patent Application Publication No . 20150262298, entitled "IMPROVED MARKET OPERATION THROUGH REGULATION OF INCOMING ORDER MATCH ALLOCATION AND/OR DYNAMIC RESTING ORDER MATCH ALLOCATION PRIORITIES", incorporated by reference herein.

Figure 4:
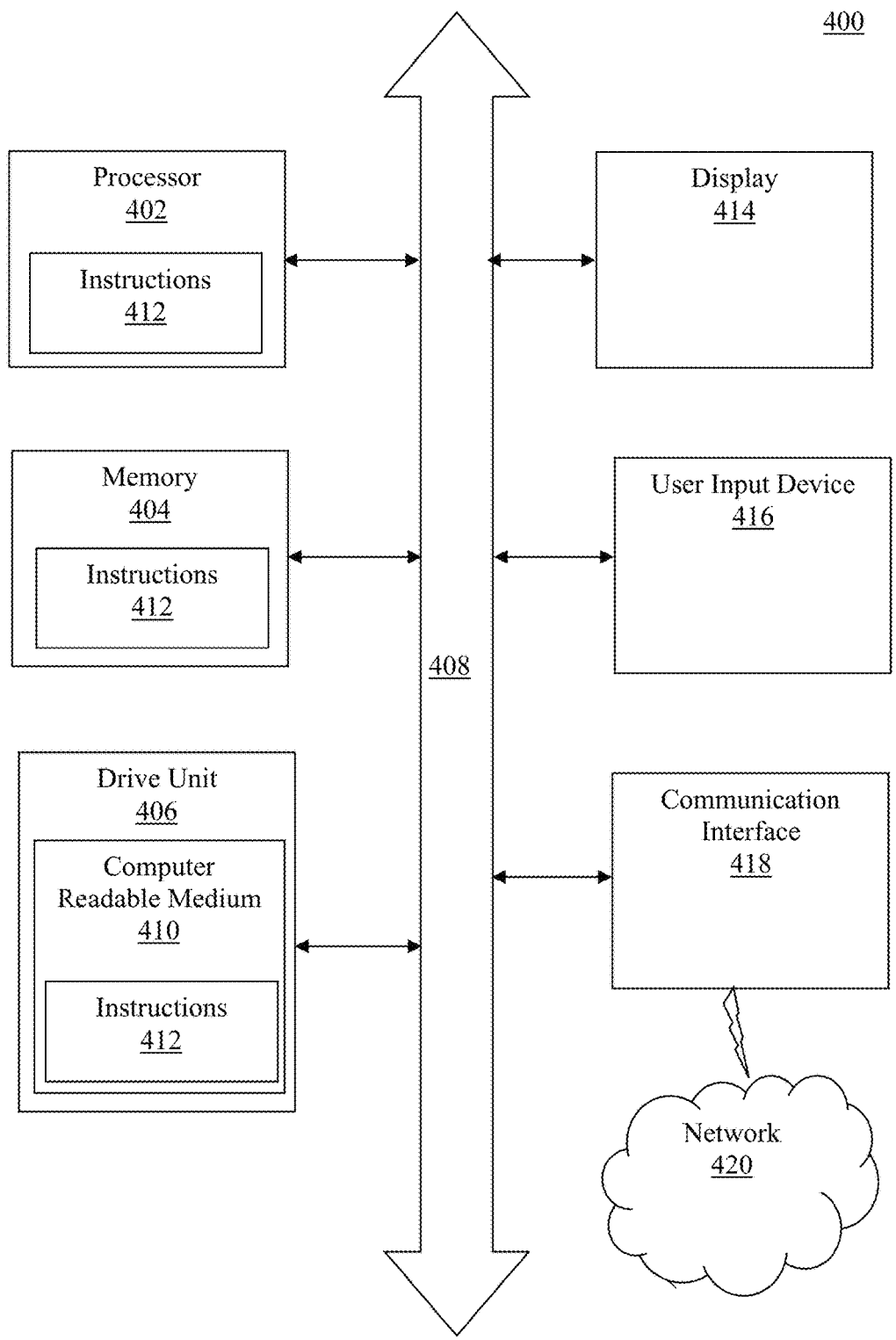
FIG. 4 shows an illustrative embodiment of a general computer system for use with the system of FIGS. 1-3.

The disclosed embodiments are preferably implemented with computer devices and computer networks, such as those described with respect FIG. 4 and improved as described herein, that allow users, e.g. market participants or traders, to exchange trading information with an electronic trading system as described. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange. An exemplary trading network environment for implementing trading systems and methods is shown in FIG. 1. An electronic trading system 100, referred also to as the "exchange" or "exchange computer system," receives orders and transmits market data related to orders and trades to users, e.g., automatically, such as via wide area network 126 and/or local area network 124 and computer devices 114, 116, 118, 120 and 122, as will be described below, coupled with the electronic trading system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The electronic trading system 100 may be implemented with one or more mainframe, desktop or other computers, such as the computer 400 described below with respect to FIG. 4. A user database 102 may be provided which includes information identifying traders and other users of electronic trading system 100, such as account numbers or identifiers, user names and passwords. An account data module 104 may be provided which may process account information that may be used during transactions, such as trades. A match engine module 106 may be included to match bid and offer prices and may be implemented with software and/or hardware that executes one or more algorithms for matching bids and offers as will be described in more detail elsewhere herein. A trade database 108 may be included to store information identifying trades and descriptions of trades. In particular, a trade database may store information identifying the time that a trade took place and the contract price. An order book module 110 may be included to compute or otherwise determine current bid and offer prices and may further include a database or other data structure which stores data indicative of previously received but unsatisfied orders as described herein. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the electronic trading system 100.

The trading network environment shown in FIG. 1 includes exemplary computer/client devices 114, 116, 118, 120 and 122 which depict different exemplary methods or media by which a computer/client device may be coupled with the electronic trading system 100 or by which a user may communicate, e.g. send and receive, electronic data transaction request messages and responses thereto, e.g. trade or other information therewith. It will be appreciated that the types of computer/client devices deployed by traders and the methods and media by which they communicate with the electronic trading system 100 is implementation dependent and may vary and that not all of the depicted computer devices and/or means/media of communication may be used and that other computer devices and/or means/media of communications, now available or later developed may be used. Each computer/client device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the electronic trading system 100. Depending on the type of computer/client device, a user can interact with the computer with a keyboard, pointing device, microphone, pen device or other input device now available or later developed.

An exemplary computer/client device 114 is shown directly connected to electronic trading system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer/client device 114 or a user thereof. The user of the exemplary computer/client device 114, or the exemplary computer/client device 114 alone and/or autonomously, may then transmit the trade or other information to the electronic trading system 100.

Exemplary computer/client devices 116 and 118 are coupled with a local area network ("LAN") 124 which may be composed of one or more public or private wired and/or wireless networks and configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. PDA 122 may also communicate with electronic trading system 100 via a conventional wireless hub 128.

As was described above, different client devices 114, 116, 118, 120 and 122 may feature different capabilities, e.g. processing speed, processing efficiency, etc., resulting in varying latencies between receipt of notification of some event, e.g. a change in a market, and transmission of a response thereto, e.g. an electronic data transaction request message comprising an order, seeking to capitalize on this event. For example, some client devices 114, 116, 118, 120 and 122 may be fully automated and automatically analyze received data indicative of market events and generate and transmit response thereto without human intervention, such as may be used by high frequency traders. Other client devices 114, 116, 118, 120 and 122 may simply present received data indicative of market events to the user thereof and await input from the user directing the device 114, 116, 118, 120 and 122 to generate a response. Still some devices 114, 116, 118, 120 and 122 may feature hardware and or software architectures specifically designed/optimized to reduce such latencies, e.g. using intelligent network communications devices to place the order processing capability of the device 114, 116, 118, 120 and 122 as close to the network connection as possible. Some devices 114, 116, 118, 120 and 122 may lack safeguards which are designed to prevent errant submissions but which increase latency, such as functions which require secondary confirmation before submission, functions which validate submissions for errors, e.g. extreme or uncharacteristic variations in price or quantity of an order, etc.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer/client device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto. It will be appreciated where the interconnections 124, 126 between the client devices 114, 116, 118, 120 and 122 and the electronic trading system 100 utilize multipath protocols such as mesh networking, packet switching, TCP/IP, etc., multiple physical and/or logical communications routes may be available over which a given electronic data transaction request message may travel when being communicated over these networks. The choice of route over all or a portion of the networks 124, 126 may or may not be under the control user, the client device 114, 116, 118, 120 and 122 and/or the electronic trading system 100, e.g. routing may be subject to error correction protocols, congestion control protocols, quality of service protocols, outages or intermittent errors.

Furthermore, the addition, by electronic trading systems 100, of additional channels of communication 124, 126 in an effort to increase capacity and opportunity, along with increased bandwidth of each channel, allows for more transactions to be submitted over multiple parallel paths into the system. Accordingly, not only must the electronic trading system 100 discriminate among closely received incoming transactions, but must further arbitrate among transactions received simultaneously, or temporally so close together as to be considered simultaneously received, i.e. the difference in their time of receipt being to close to measure by the implemented discrimination mechanisms, also referred to as "substantially simultaneously".

As was described above, the various interconnections 124, 126 by which the exemplary computer/client devices 114, 116, 118, 120 and 122 communicate with the electronic trading system 100 may be characterized by different static or dynamic latencies such that a communication broadcast by the electronic trading system 100 to more than one of the exemplary computer/client devices 114, 116, 118, 120 and 122 may be received by at least one of those devices 114, 116, 118, 120 and 122 at a different time, earlier or later, relative to the receipt of that broadcasted communication by another of those devices 114, 116, 118, 120 and 122, a communication initiated by one device 114, 116, 118, 120 and 122 and another communication initiated substantially simultaneously therewith by another device 114, 116, 118, 120 and 122, may be received at different times, either earlier or later, at the electronic trading system 100, or a communication initiated by one device 114, 116, 118, 120 and 122 may be received later in time by the electronic trading system than another communication initiated by another device 114, 116, 118, 120 and 122, later in time. Some interconnections may be characterized by latencies which are significantly less than other interconnections allowing those users connected thereby to communicate electronic data transactions request messages to the electronic trade system 100 much more quickly than others.

The arbitrary nature of the variance in latency between devices 114, 116, 118, 120 and 122 and/or the networks 124, 126 which interconnect them with the electronic trading system 100 may provide a desirable random or pseudo random variation in the capability of users to learn of and capitalize on market events, mitigating convergence of multiple responses at the electronic trading system 100, which in concert with the mechanisms which arbitrate among, or otherwise distinguish between substantially simultaneously received competing transactions, implements a system which may be observed to be fair and balanced in the aggregate.

However, such variance in latencies of the client devices 114, 116, 118, 120 and 122 and the networks 124, 126 which interconnect them with the electronic trading system 100, in concert with the transaction processing system implemented thereby generally allocating transactional opportunities to competing transaction requests based on order of receipt thereby, may incentivize users to exploit such inequities in the architecture and infrastructure of the devices 114, 116, 118, 120 and 122, networks 124, 126 and/or electronic trading system 100, and/or incentivize investment in technologies directed to minimizing or otherwise reducing these latencies, e.g. faster client devices 114, 116, 118, 120 and 122, faster networks 124, 126, and/or shorter paths between them and the electronic trading system 100. As minor decreases in latency may come at exponentially increasing costs, such investment reduces capital which may be otherwise used for other purposes. Users may be incentivized to expend significant resources to gain minor improvements. Users unable to make such investments may be at a disadvantage and may be discouraged from participating. Furthermore, as latencies are reduced, the ability of the electronic trading system 100 to discriminate among these ever-more closely converging competing incoming transactions for the purpose of discerning order of receipt may be exceeded which may then result in non-deterministic operation.

In particular, a user who wishes to cancel a pending yet-unsatisfied transaction, e.g. because the transaction was placed in error or a change in circumstances has rendered the pending transaction disadvantageous to that user, may be unable to do so before a user having a lower latency is able to submit a counter transaction to capitalize upon the opportunity.

It will be appreciated that a solution to the issue of converging response latencies is to improve the discriminatory capability of the electronic trading system 100 to distinguish among closely received competing transactions, such as by implementing high speed communications interfaces, high resolution time keeping, etc. However, such solutions may not alleviate the issue where users will continue to invest in improvements which parallel or exceed the improvements to the electronic trading system.

Another solution may be to group or collect together incoming competing transactions over a time window, predefined or otherwise, and then allocate the transactional opportunity to or among those competing transactions randomly. However, as such a system would likely implement a pseudo random algorithm, such as a system would be vulnerable to users learning the pseudo random algorithm and timing their submission in accordance therewith. Further, users may be incentivized to submit numerous orders, referred to as "stuffing," in order to increase the probability that one of those orders will succeed.

The disclosed embodiments relate to systems and methods which mitigate latency as a factor in allocating transactional opportunities by, e.g., automatically, grouping, collecting or otherwise buffering together, e.g. into a group, bucket, set, collection, etc., competing transactions requests for the transactional opportunity that are received within a defined window/period prior to forwarding those transaction requests to the matching processor 106 and, subsequent to the closing of that window/period, allocating, e.g., automatically, the transactional opportunity among the grouped transaction requests based on a secondary factor included with each request defined by the user and unrelated to order of receipt, e.g. determined based on the best secondary/reservation price value(s) optionally provided with/defined by each incoming transaction request. The resulting transaction request(s) which succeed in this process may then be submitted, e.g., automatically, to the matching processor 106 at the secondary, i.e. improved, price. In this manner, the benefit of low latency is reduced as will be described. Further, the user holding the previously unsatisfied transaction request that has now been satisfied, receives the benefit of the improved secondary price.

As was described above, the users of the electronic trading system 100 may include one or more market makers 130 which may maintain a market by providing constant bid and offer prices for a derivative or security to the electronic trading system 100, such as via one of the exemplary computer devices depicted. The electronic trading system 100 may also exchange information with other trade engines, such as trade engine 138. One skilled in the art will appreciate that numerous additional computers and systems may be coupled to electronic trading system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to electronic trading system 100. In another example, the exemplary computer device 118 may include computer-executable instructions for receiving market data from electronic trading system 100 and displaying that information to a user.

Of course, numerous additional servers, computers, handheld devices, personal digital assistants, telephones and other devices may also be connected to the electronic trading system 100. Moreover, one skilled in the art will appreciate that the topology shown in FIG. 1 is merely an example and that the components shown in FIG. 1 may include other components not shown and be connected by numerous alternative topologies.

Figure 2:
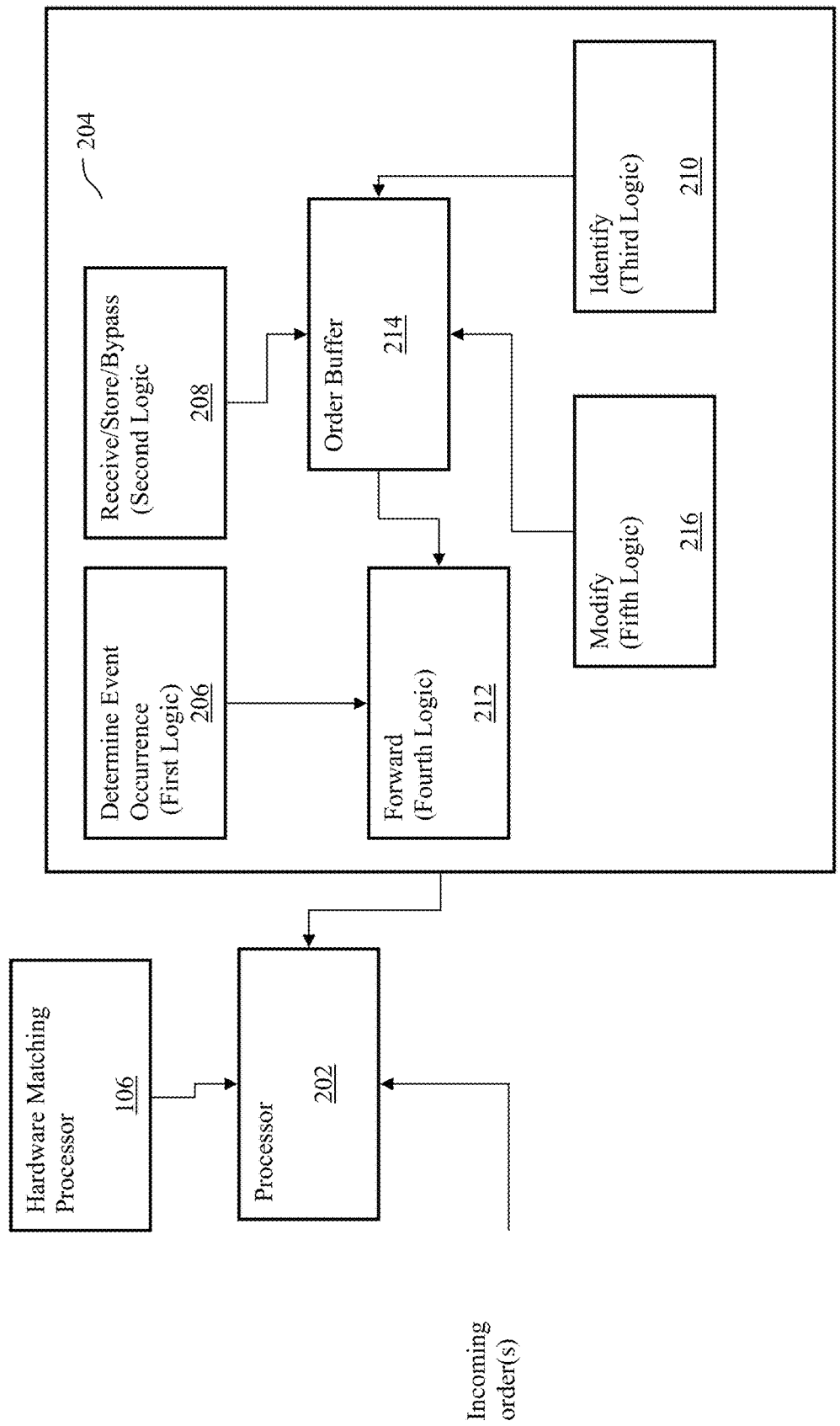
FIG. 2 depicts a block diagram of an exemplary implementation of the system of FIG. 1 for mitigating latency among competing incoming electronic data transaction request messages.

FIG. 2 depicts a block diagram of an order processor module 136 according to one embodiment, which in an exemplary implementation, is implemented as part of the electronic transaction processing system implementing an electronic trading system 100 described above. As used herein, an electronic trading system 100, i.e. exchange, includes an electronic transaction processing system that receives electronic data transaction request messages comprising orders to trade and/or executes those orders via a hardware matching processor 106 as described. It will be appreciated that the disclosed embodiments may be implemented by or in conjunction with other modules or components of the electronic trading system 100. While the disclosed embodiments will be described with respect to a separate implementation for each hardware match engine processor, market or order book database, it will be appreciated that the disclosed embodiments may also be implemented across the entire electronic trading system 100 such as for example, by further denoting incoming orders by their intended market and separately processing orders received for a given market as described herein.

In particular, FIG. 2 depicts a block diagram of a system 200, which may also be referred to as an architecture, for mitigating latency disparity between different client devices 114, 116, 118, 120 and 122 and an electronic data transaction processing system 100, due to, for example, disparity in client device 114, 116, 118, 120 and 122 capabilities and/or interconnection 124/126 capabilities, in which data items are transacted, e.g., automatically, by a hardware matching processor 106 that matches, as they are received, incoming electronic data transaction request messages, for one of the data items based on a first set of transaction parameters, received from the different client devices 114, 116, 118, 120 and 122 over a data communication network 124/126 with at least one other previously received but unsatisfied electronic data transaction request message counter thereto to at least partially satisfy one or both of the incoming electronic data transaction request messages or the at least one other previously received electronic data transaction request message, wherein the first set of transaction parameters comprises a first parameter, e.g. an offer price, having a first value, and further wherein each of the incoming electronic data transaction request messages may include a second parameter having a second value, e.g. a secondary or reservation price. In one embodiment, the secondary value is a price value. In an alternative embodiment, the secondary value may be a price increment used to modify the first parameter to derive a secondary price value. The secondary value may be optional. In one embodiment, if the secondary value is not provided, the secondary value is assumed, in the embodiment where the value is an increment, to be 0, and in the embodiment where the secondary value is a price value, assumed to be the same as the first parameter value. In an alternate embodiment, the lack of a secondary value in a received incoming electronic data transaction message indicates that the user who submitted the request does not wish their request to be evaluated in concert with competing requests, e.g. does not wish to take part in the disclosed grouping/allocation process. Alternatively, a separate indicator may be included within each electronic transaction data request to indicate whether submitting user wishes to partake in below described grouping/allocation process or not. Generally, the secondary parameter may specify or define an alternative price value, specifically or via an increment of the offer price, to be used in the grouping/allocation process describe below. In one embodiment, the secondary parameter may be specified in whole ticks/price increments or in fractions thereof. It will be appreciated that the fractional precision, i.e. number of decimal places, at which the second parameter may be specified may be defined so as to minimize the probability of two or more market participants specifying the same value thereof. In an alternative embodiment, the matching processor 106 may be implemented by a combination of hardware and software as described above.

The system 200 includes an interval processor 206, which may be implemented as a separate component or as one or more logic components, such as on an FPGA which may include a memory or reconfigurable component to store logic and processing component to execute the stored logic, or as first logic 206, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, determine, e.g., automatically, an occurrence of a first event and a subsequent occurrence of a second event. In one embodiment, In one embodiment, the first and second events define an elapse of an interval of time. In particular, in one embodiment, the time interval may begin to elapse upon receipt, e.g. the first event, of an incoming order subsequent to a prior elapse of the time interval. In one embodiment, the time interval may begin to elapse upon transmission, e.g. the first event, of notification of a previously received but not satisfied electronic data transaction request to the different client devices 114, 116, 118, 120 and 122, i.e. upon resting of an order on the order book, at any price or at the best price, and subsequent transmission of a market data message advertising this transaction opportunity to the market participants via the client devices 114, 116, 118, 120 and 122. In one embodiment, the first event may comprise receipt of an acknowledgment from the hardware matching processor acknowledging receipt of previously forwarded incoming orders. In all cases, the interval may then close, e.g., automatically, upon expiration of a defined period of time, e.g. the second event, such as 5 microseconds, the accumulation of a defined number of incoming transaction requests, e.g. meeting or exceeding a threshold, or other measure or event or combination thereof. In one embodiment, the duration of the time interval may be variable and may be random. Regardless, the disclosed embodiments may enable the participants to dynamically define or otherwise control when, and/or how many, competing incoming transactions are grouped together, as described, via or otherwise based on the participants' responsiveness to transactional opportunities, e.g. the number of responses and/or the rate or latency with which the participants respond to such opportunities. For example, the more that participants rapidly respond to an opportunity, the more they will have to compete to capitalize upon that opportunity. Furthermore, the disclosed embodiments eliminate any incentive for waiting to submit a transaction, as there is no advantage to such delay and participants may risk failing to timely submit their transaction in order participate, and thereby maintain continuous price discovery.

The system 200 further includes an incoming order receiver 208 coupled with the interval processor 206, which may be implemented as a separate component or as one or more logic components, such as on an FPGA which may include a memory or reconfigurable component to store logic and processing component to execute the stored logic, or as second logic 208, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, receive, e.g., automatically, incoming electronic data transaction request messages and store, accumulate, buffer or otherwise group or collect the received incoming electronic data transaction request messages in a memory 204/214 coupled with the incoming order receiver 206 prior to forwarding the received incoming electronic data transaction request messages to the hardware matching processor 106. The memory 204/214 may be a part of the memory 204 or separate therefrom. In one embodiment, the received incoming electronic data transaction requests may be stored in the memory in association with data indicative of time and/or order of receipt by the incoming order receiver.

The system 200 further includes an order identifier 210, coupled with the memory 214/204, the order receiver 208 and the interval processor 206, and which may be implemented as a separate component or as one or more logic components, such as on an FPGA which may include a memory or reconfigurable component to store logic and processing component to execute the stored logic, or as third logic 210, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, upon the occurrence of the second event, identify, e.g., automatically, a first subset of at least two of the stored incoming electronic data transaction request messages wherein values of at least a subset of the first set of transaction parameters thereof are identical, e.g. same product and side, or otherwise indicative of the orders therein competing for the same transactional opportunity but not necessarily the same quantity, and determine whether the hardware matching processor would match any of the first subset of stored incoming electronic data transaction request messages, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message. If the first subset contains only a single electronic data transaction request message or there are no previously received but unsatisfied electronic data transaction requests, i.e. no resting orders on the order book database, which would match against the transaction requests in the first subset, those transaction requests may be forwarded, e.g., automatically, to the hardware matching processor 106 in the order in which they were received, e.g. no grouping/bucketing is necessary because there is no competition for any resting quantity. In one embodiment, incoming electronic data transaction request messages may be tested, e.g., automatically, for a possible match against previously received but unsatisfied electronic data transaction request messages as the incoming requests are received rather than waiting until the second event occurs.

Where the stored incoming electronic data transaction request messages include multiple subsets thereof having identical values of the first set of transaction parameters, the system 200 may process, e.g., automatically, each subset in turn as described herein, such as in the order of receipt of the earliest electronic data transaction request message in each subset.

In one embodiment, the first set of parameters of each of the transactions included in the first subset must specify the same price. Alternatively, the first set of parameters of each of the transactions included in the first subset must specify the same or a better price.

In one embodiment, the first set of parameters may include an identifier indicative of the product or data item, e.g. financial instrument, to which the electronic data transaction request message pertains. This may permit the system 200 to buffer transaction requests for different order book databases linked by implication allowing for application of the disclosed embodiments to markets offering implication, e.g. to implied transactional opportunities.

The system 200 further includes an order forwarder 212, coupled with the memory 214/204, the order identifier 210, the order receiver 208 and the interval processor 206, and which may be implemented as a separate component or as one or more logic components, such as on an FPGA which may include a memory or reconfigurable component to store logic and processing component to execute the stored logic, or as fourth logic 212, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, upon the occurrence of the second event, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message, modify, e.g., automatically, the first value of the first transaction parameter of the first set of transaction parameters of each of the stored incoming electronic data transaction request messages based on the second value of the second parameter, e.g. add the secondary price increment to the originally specified price or otherwise substitute the secondary price for the original price, if included therewith, and determine, e.g., automatically, based on the modified first set of transaction parameters of each of the stored incoming electronic data transaction request messages, at least one second subset, e.g. one or more of those transaction requests, thereof which would be matched, e.g. has the best price or would otherwise win the competition among the grouped requests, by the hardware matching processor with at least one other previously received but unsatisfied electronic data transaction request message counter thereto to at least partially satisfy one or both of the second subset of stored incoming electronic data transaction request messages or the at least one other previously received electronic data transaction request message, and forward each stored electronic data transaction request message of each of the at least one second subset, each having, if modified, the modified first set of transaction parameters, to the hardware matching processor in the order in which they were received by the incoming order receiver and, subsequent thereto, forward each remaining stored electronic data transaction request message of the first subset, each having their associated first set of transaction parameters, to the hardware matching processor in the order in which they were received by the incoming order receiver, i.e. FIFO with respect to the order in which these transaction were received by the electronic trading system 100. Any other orders not included in the first subset, e.g. non-competing orders, would be then be similarly processed, i.e. subject to the above described grouping/allocation process and/or forwarded to the hardware matching processor 106 in order of time of receipt. As the transactions in the second subset are forwarded to the hardware matching processor 106 with the modified price values, they will match with the previously received but unsatisfied transaction requests at the improved price providing a benefit to the submitting market participant(s) of those previously received but unsatisfied, i.e. resting, transaction requests.

In one embodiment, if the transactions included in the second subset exceed the available quantity of the previously received but unsatisfied transaction requests, the transactions of the second subset may be broken down, e.g., automatically, in to separate transaction requests, one characterized by the specific available quantity of the previously received but unsatisfied transactions, one characterized by the remaining quantity wherein the former is forwarded first to the matching processor 106 as described above, and the latter is forwarded along with the remaining transactions of the first subset in FIFO order as described. By splitting transactions in this manner, the disclosed embodiments may exercise more discrete control over the matching process, especially in embodiments implemented in conjunction with existing matching processors 106.

As will be described in more detail below, where the incoming electronic data transaction request messages in the first subset include requests to modify, e.g. alter or cancel, a previously received but unsatisfied electronic data transaction request, those requests may be forwarded, e.g., automatically, to the hardware matching processor 106 to be processed to the extent those requests would have been effective if all of the transaction requests in the first subset were executed in the order in which they were received. If the processing of a request to modify a prior request results in entirely eliminating the prior request, the remaining transaction within the first subset may simply be forwarded to the hardware matching processor 106 in the order in which they were received.

As was noted above, in embodiments where the lack of a secondary parameter, a secondary parameter value of 0, or a separate indicator indicates a desire by a market participant not to participate in the grouping/allocation process, those electronic data transaction request messages having such parameters may be excluded, e.g., automatically, from inclusion in the second subset and otherwise processed in accordance with their submitted transaction parameters.

It will be appreciated that the grouping/allocation process described above can be iteratively performed across sets of the transaction request messages having different price levels, until all suitable previously received but unsatisfied transaction requests have been satisfied.

As described above, the above process effectively defines, e.g., automatically, the order in which incoming electronic data transaction requests will be forwarded to the match engine processor 106 which then performs the matching process according to whatever matching algorithm, e.g. FIFO or pro-rata, etc., the hardware matching processor 106 is configured for. For competing transactions, the above described grouping process, by virtue of defining the order of submission to the hardware matching processor 106, determine which of those competing transactions will be allocated a given transactional opportunity and may be irrespective of the order in which the competing electronic data transaction request messages were received by the electronic trading system 100. Thereby, differences in latencies among these competing transaction requests are mitigated, e.g., automatically, in favor of a grouping/competition therebetween based on arbitrarily specified price improvements. In embodiments for use with transaction processing systems which do not offer implication, the matching processor 106 may not be altered to accommodate the disclosed reservation price system, i.e. the matching processor 106 merely matches incoming transactions according to whatever matching algorithm it is configured to apply wherein the order in which the matching processor 106 received those transaction may be altered by the disclosed embodiments to be different than the order in which those transactions were received by the electronic trading system 100 based on the above described grouping and allocation process. In embodiments for use with transaction processing systems which offer implication but where allowing transactions with reservation prices to match with implied opportunities may complicate system operation, as described elsewhere herein, the matching processor 106 may be configured so as to, upon receipt of an transaction request having a reservation price for matching, ignore, e.g., automatically, any resting implied opportunities and only match the transaction request against real resting transactions. In this case, the disclosed embodiments, and in particular, the order forwarder 212, may be configured to signal, e.g., automatically, via data indicative thereof included with the forwarded request, to the matching processor 106 that a forwarded transaction request includes a reservation price value rather than its originally specified price value. It will be appreciated that in other embodiments, no distinction may be made between real orders and implied opportunities with respect to the disclosed process for arbitrating among incoming transaction requests.

In one embodiment, the interval processor 206, incoming order receiver 208, order identifier 210 and order forwarder 212 are comprised by the hardware matching processor 106.

In one embodiment, wherein the incoming electronic data transaction request messages may include a request to modify, e.g. alter or cancel, at least one other previously received electronic data transaction request message, the system 200 may further include an order modifier 216, coupled with the memory 214/204, the order identifier 210, the order receiver 208 and the interval processor 206, and which may be implemented as a separate component or as one or more logic components, such as on an FPGA which may include a memory or reconfigurable component to store logic and processing component to execute the stored logic, or as fifth logic 216, e.g. computer program logic, stored in a memory 204, or other non-transitory computer readable medium, and executable by a processor 202, such as the processor 402 and memory 404 described below with respect to FIG. 4, to cause the processor 202 to, or otherwise be operative to, upon the occurrence of the second event and wherein it is determined that the hardware matching processor would match any of the first subset of stored incoming electronic data transaction request messages, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message, identify and forward, e.g., automatically, to the hardware matching processor any of the stored incoming electronic data transaction request messages comprising a request to modify, e.g. alter or cancel, any of at least one other previously received but unsatisfied electronic data transaction request messages to the extent those identified stored incoming electronic data transaction request messages comprising a request to modify any of at least one other previously received but unsatisfied electronic data transaction request messages would have been effective if at least all of the subset of stored incoming electronic data transaction request messages and the identified stored incoming electronic data transaction request messages comprising a request to modify any of at least one other previously received but unsatisfied electronic data transaction request messages were forwarded to the hardware matching processor in the order in which they were received by the incoming order receiver. In this embodiment, the order identifier 210 is further operative upon the occurrence of the second event and subsequent to the forwarding of any of the stored incoming electronic data transaction request messages comprising a request to modify any of at least one other previously received but unsatisfied electronic data transaction request messages, and wherein it is subsequently determined that the hardware matching processor would still match any of the first subset of stored incoming electronic data transaction request messages. That is, requests to modify previously received transactions contained within the first subset, i.e. the grouped transaction requests, are executed, e.g., automatically, by the hardware matching processor 106 to the extent those requests would have been effective had they been executed in the order in which they were received relative to the other transactions in the group.

In one embodiment, the incoming order receiver 208 is further operative to receive the incoming order when the incoming order's arrival relative to another incoming order has been determined, e.g. at the match engine 106 or otherwise at the point of incoming order ingress or other point of determinism as was described above. Incoming order receiver may preserve or otherwise store data indicative of the order of arrival with each incoming order. In one embodiment, the interval processor 206, incoming order receiver 208 and order forwarder 210 are comprised by the match engine 106.

In one embodiment, each order is characterized by any of a set of order types, the order forwarder being further operative to forward or otherwise bypass, e.g., automatically, the incoming order to the match engine upon receipt thereof when the order type thereof is one of a subset of the set of order types. For example, in one embodiment, the subset of order types includes at least one of administrative message, control message, cancel message, order modification message, or combinations thereof. Order modification messages may include messages which alter an order that was earlier received but not yet matched or a resting order, e.g. modifies the resting quantity. This may permit the match engine act on cancel or modify messages, for example, in advance of other messages, such as orders which would have matched against the order to be canceled. It will be appreciated that whether cancel or modify messages are processed first or last, or otherwise in order of receipt, is implementation dependent and may depend on business and/or regulatory rules defining how and when a trader may cancel an order. As an alternative to bypassing orders around the grouping mechanism, these order types may be flagged to be allocated first or last out of the group when the group of orders is forwarded to the match engine. In an implementation designed, at least in part, to regulate incoming order flow relative to the capacity of the system, e.g. where the event which triggers forwarding is based on a signal indicative of processing capacity, this would allow the match engine 106 process such messages according to its processing capacity.

In one embodiment, the order forwarder 210 may be further operative to allow, e.g., automatically, a subsequently received incoming transaction/order to modify or cancel a stored received incoming order prior to a forwarding thereof to the match engine. By, for example, allowing orders to be canceled or modified prior to forwarding, the processing demands on the match engine 106 may be reduced.

Figure 3:
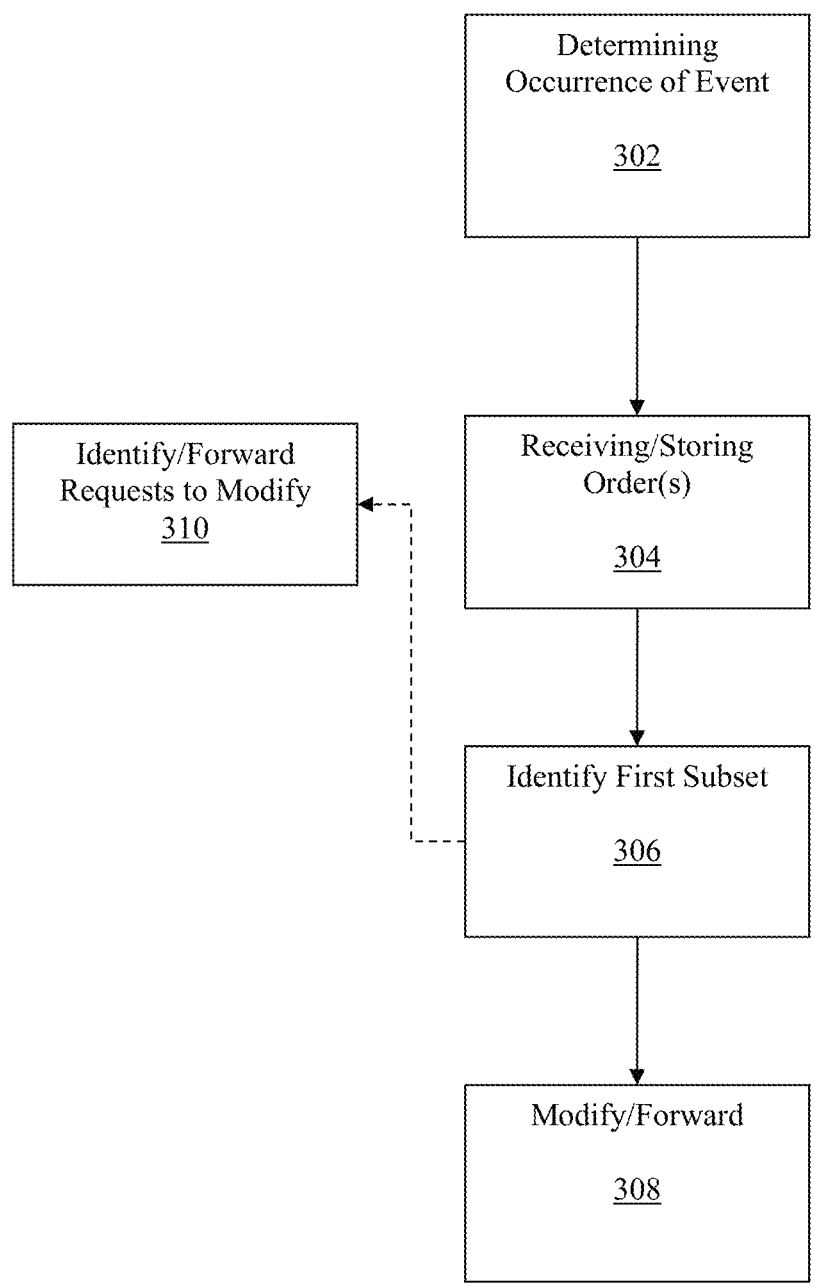
FIG. 3 depicts a flow chart showing operation of the system of FIGS. 1 and 2.

FIG. 3 depicts a flow chart showing operation of the system 200 of FIG. 2. In particular FIG. 3 shows a computer implemented method for mitigating latency disparity between different client devices 114, 116, 118, 120 and 122 and an electronic data transaction processing system 100 in which data items are transacted, e.g., automatically, by a hardware matching processor 106 that matches, as they are received, incoming electronic data transaction request messages, for one of the data items based on a first set of transaction parameters, received from the different client devices 114, 116, 118, 120 and 122 over a data communication network 124, 126 with at least one other previously received but unsatisfied electronic data transaction request message counter thereto to at least partially satisfy one or both of the incoming electronic data transaction request messages or the at least one other previously received electronic data transaction request message, wherein the first set of transaction parameters comprises a first parameter having a first value, and further wherein each of the incoming electronic data transaction request messages may include a second parameter having a second value. In one embodiment, the secondary value is a price value. In an alternative embodiment, the secondary value may be a price increment used to modify the first parameter to derive a secondary price value. The secondary value may be optional. In one embodiment, if the secondary value is not provided, the secondary value is assumed, in the embodiment where the value is an increment, to be 0, and in the embodiment where the secondary value is a price value, assumed to be the same as the first parameter value. In an alternate embodiment, the lack of a secondary value in a received incoming electronic data transaction message indicates that the user who submitted the request does not wish their request to be evaluated in concert with competing requests, e.g. does not wish to take part in the grouping/arbitration process. Alternatively, a separate indicator may be included within each electronic transaction data request to indicate whether submitting user wishes to partake in below described grouping/arbitration process or not. Generally, the secondary parameter may specify or define an alternative price value, specifically or via an increment of the offer price, to be used in the grouping/arbitration process describe below. In one embodiment, the secondary parameter may be specified in whole ticks/price increments or in fractions thereof. It will be appreciated that the fractional precision, i.e. number of decimal places, at which the second parameter may be specified may be defined so as to minimize the probability of two or more market participants specifying the same value thereof.

The operation of the system 200 includes: determining, e.g., automatically, by an incoming order processor, an occurrence of a first event and a subsequent occurrence of a second event [Block 302]; and receiving, by the incoming order processor, incoming electronic data transaction request messages and storing the received incoming electronic data transaction request messages in a memory coupled with the incoming order processor prior to forwarding the received incoming electronic data transaction request messages to the hardware matching processor [Block 304].

In one embodiment, the first and second events define an elapse of an interval of time. In particular, in one embodiment, the time interval may begin to elapse upon receipt, e.g. the first event, of an incoming order subsequent to a prior elapse of the time interval. In one embodiment, the time interval may begin to elapse upon transmission, e.g. the first event, of notification of a previously received but not satisfied electronic data transaction request to the different client devices 114, 116, 118, 120 and 122, i.e. upon resting of an order on the order book, at any price or at the best price, and subsequent transmission of a market data message advertising this transaction opportunity to the market participants via the client devices 114, 116, 118, 120 and 122. In one embodiment, the first event may comprise receipt of an acknowledgment from the hardware matching processor acknowledging receipt of previously forwarded incoming orders. In all cases, the interval may then close upon expiration of a defined period of time, e.g. the second event, such as 5 microseconds, the accumulation of a defined number of incoming transaction requests, e.g. meeting of exceeding a threshold, or other measure or event or combination thereof. In one embodiment, the duration of the time interval may be variable and may be random.

The operation of the system 200 further includes: identifying, e.g., automatically, by the incoming order processor, upon the occurrence of the second event, a first subset of at least two of the stored incoming electronic data transaction request messages wherein values of at least a subset of the first set of transaction parameters thereof are identical, and determining whether the hardware matching processor would match any of the first subset of stored incoming electronic data transaction request messages, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message [Block 306].

Where the stored incoming electronic data transaction request messages include multiple subsets thereof having identical values of the first set of transaction parameters, the system 200 may process each subset in turn as described herein, such as in the order of receipt of the earliest electronic data transaction request message in each subset.

In one embodiment, the first set of parameters of each of the transactions included in the first subset must specify the same price. Alternatively, the first set of parameters of each of the transactions included in the first subset must specify the same or a better price.

In one embodiment, the first set of parameters may include an identifier indicative of the product or data item, e.g. financial instrument, to which the electronic data transaction request message pertains. This may permit the system 200 to buffer transaction requests for different order book databases linked by implication allowing for application of the disclosed embodiments to implied transactional opportunities.

The operation of the system 200 further includes: modifying, e.g., automatically, by the incoming order processor, upon the occurrence of the second event, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message, the first value of the first transaction parameter of the first set of transaction parameters of each of the stored incoming electronic data transaction request messages based on the second value of the second parameter, if included therewith, and determining based on the modified first set of transaction parameters of each of the stored incoming electronic data transaction request messages, at least one second subset thereof which would be matched by the hardware matching processor with at least one other previously received but unsatisfied electronic data transaction request message counter thereto to at least partially satisfy one or both of the second subset of stored incoming electronic data transaction request messages or the at least one other previously received electronic data transaction request message, and forwarding each stored electronic data transaction request message of each of the at least one second subset, each having, if modified, the modified first set of transaction parameters, to the hardware matching processor in the order in which they were received by the incoming order processor and, subsequent thereto, forward each remaining stored electronic data transaction request message of the first subset, each having their associated first set of transaction parameters, to the hardware matching processor in the order in which they were received by the incoming order processor [Block 308].

In one embodiment, if the transactions included in the second subset exceed the available quantity of the previously received but unsatisfied transaction requests, the transactions of the second subset may be broken down in to separate transaction requests, one characterized by the specific available quantity of the previously received but unsatisfied transactions, one characterized by the remaining quantity wherein the former is forwarded first to the matching processor 106 as described above, and the latter is forwarded along with the remaining transactions of the first subset in FIFO order as described. By splitting transactions in this manner, the disclosed embodiments may exercise more discrete control over the matching process, especially in embodiments implemented in conjunction with existing matching processors 106.

As will be described in more detail below, where the incoming electronic data transaction request messages in the first subset include requests to modify, e.g. alter or cancel, a previously received but unsatisfied electronic data transaction request, those requests may be forwarded to the hardware matching processor 106 to be processed to the extent those requests would have been effective if all of the transaction requests in the first subset were executed in the order in which they were received. If the processing of a request to modify a prior request results in entirely eliminating the prior request, the remaining transaction within the first subset may simply be forwarded to the hardware matching processor 106 in the order in which they were received.

As was noted above, in embodiments where the lack of a secondary parameter, a secondary parameter value of 0, or a separate indicator indicates a desire by a market participant not to participate in the grouping/arbitration process, those electronic data transaction request messages having such parameters may be excluded from inclusion in the second subset.

It will be appreciated the grouping/arbitration process described above can be iteratively performed across sets of the transaction request messages having different price levels, until all suitable previously received but unsatisfied transaction requests have been satisfied.

As described above, the above process effectively defines the order in which incoming electronic data transaction requests will be forwarded to the match engine processor 106 which then performs the matching process according to whatever matching algorithm, e.g. FIFO or pro-rata, etc., the hardware matching processor 106 is configured for. For competing transactions, the above described grouping/arbitration process, by virtue of defining the order of submission to the hardware matching processor 106, determines which of those competing transactions will be allocated a given transactional opportunity and may be irrespective of the order in which the competing electronic data transaction request messages were received by the electronic trading system 100. Thereby, differences in latencies among these competing transaction requests are mitigated, e.g., automatically, in favor of an grouping/arbitration based on arbitrarily specified price improvements.

In one embodiment, the interval processor 206, incoming order receiver 208, order identifier 210 and order forwarder 212 are comprised by the hardware matching processor 106.

In one embodiment, wherein the incoming electronic data transaction request messages may include a request to modify at least one other previously received electronic data transaction request message, the operation of the system 200 may further include identifying and forwarding, upon, e.g., automatically, the occurrence of the second event and wherein it is determined that the hardware matching processor would match any of the first subset of stored incoming electronic data transaction request messages, based on the first set of transaction parameters thereof, with at least one other previously received but unsatisfied electronic data transaction request message counter thereto to at least partially satisfy one or both of the stored incoming electronic data transaction request messages or the at least one other previously received electronic data transaction request message, to the hardware matching processor any of the stored incoming electronic data transaction request messages comprising a request to modify any of at least one other previously received but unsatisfied electronic data transaction request messages to the extent those identified stored incoming electronic data transaction request messages comprising a request to modify any of at least one other previously received but unsatisfied electronic data transaction request messages would have been effective if at least all of the subset of stored incoming electronic data transaction request messages and the identified stored incoming electronic data transaction request messages comprising a request to modify any of at least one other previously received but unsatisfied electronic data transaction request messages were forwarded to the hardware matching processor in the order in which they were received by the incoming order processor [Block 310]; wherein the modifying is further subject to the occurrence of the second event and subsequent to the forwarding of any of the stored incoming electronic data transaction request messages comprising a request to modify any of at least one other previously received but unsatisfied electronic data transaction request messages, and wherein it is subsequently determined that the hardware matching processor would still match any of the first subset of stored incoming electronic data transaction request messages.

In one embodiment, the determining, receiving, identifying, modifying and forwarding are performed by the hardware matching processor.

In an electronic trading system 100 which offers implication across order book databases, as described above, to improve transaction opportunities, i.e. liquidity, competing incoming transaction requests which desire to participate in the above described grouping/arbitration process may, in one embodiment, be prevented, e.g., automatically, from matching with an implied transactional opportunity as part of the process by which the winner(s) of the grouping/arbitration process are determined whereas any transaction which do succeed in the grouping/arbitration may be submitted, as was described, to the hardware matching processor 106 in the order of receipt by the electronic trading system 100 and, according to the matching algorithm implemented by the hardware matching processor 106, match any resting transaction, including an implied opportunity. By keeping the grouping/arbitration process winner(s), having the improved secondary/reservation price, from matching implied opportunities, allocation of the improved price to the real transaction underlying the implied opportunity is simplified. In an alternative embodiment, the above described grouping/arbitration process may match against any suitable real or implied transactional opportunity. In embodiments for use with transaction processing systems which do not offer implication, the matching processor 106 may not be altered to accommodate the disclosed reservation price system, i.e. the matching processor 106 merely matches incoming transactions according to whatever matching algorithm it is configured to apply wherein the order in which the matching processor 106 received those transaction may be altered by the disclosed embodiments to be different than the order in which those transactions were received by the electronic trading system 100 based on the above described grouping and arbitration process. In embodiments for use with transaction processing systems which offer implication but where allowing transactions with reservation prices to match with implied opportunities may complicate system operation, as described elsewhere herein, the matching processor 106 may be configured so as to, upon receipt of an transaction request having a reservation price for matching, ignore any resting implied opportunities and only match the transaction request against real resting transactions. In this case, the disclosed embodiments, and in particular, the order forwarder 212, may be configured to signal, via data indicative thereof included with the forwarded request, to the matching processor 106 that a forwarded transaction request includes a reservation price value rather than its originally specified price value. It will be appreciated that in other embodiments, no distinction may be made between real orders and implied opportunities with respect to the disclosed process for arbitrating among incoming transaction requests.

In another alternative embodiment, incoming electronic data transaction request messages specifying orders at prices better than the best currently resting price, an order which may match across multiple price levels, will be excluded from inclusion in the first subset. Accordingly, only incoming requests for the same price will be grouped together.

Consider the following example:

At a past time when the order book database for product X is empty, an order to sell 10 unit at price 10 is received and is placed on the order book and advertised to the market participants.

At a later time four incoming electronic data transaction requests are received within a defined time interval in the following order:

A a new order to buy 5 at price 10 (reservation price increment 0.10)

B a request to cancel the resting 10 unit order to sell

C a new order to buy 10 at price 10 (reservation price 0.20)

D a new order to buy 10 at price 10 (reservation price 0.15)

These four orders, being received within the defined interval, are grouped together. The request to cancel is then processed to the extent it would have been processed in the order it was received, i.e. since order A would have been processed first before the cancellation, the cancellation is only effective as to 5 units of the resting quantity. Next, the orders A, C and D are evaluated as to their reservation prices 10.10, 10.20 and 10.15 respectively. In this case, order C wins the arbitration/competition and is submitted first to the hardware matching processor 106 at its reservation price of 10.20 where it is matched to the resting quantity of 5 and partially filled. The remainder of order C is then rested on the order book. Orders A and D are then submitted to the hardware matching processor 106 at their originally provided limit prices, where by virtue of the normal operation of the hardware matching processor 106, they are rested on the order book database.

Note that in the above example: had the B request to cancel been for only 5 units or the order A had been for 10 units, the B request to cancel would have been ignored or rejected back to the submitting trader as the request, in processed in the order of receipt, would have been ineffective. In one embodiment, if prior to receipt of order A, there was ONLY a resting implied opportunity to sell 5 at price 10, this implied opportunity would have been ignored when determining whether or not the incoming orders A, B or D would have matched is submitted in time order and therefore, since no "real" match would have been identified, the orders A, B, and D would be submitted to the match engine processor 106 in the order of receipt at their originally provided limit prices where, under normal operation, order A would match with the implied opportunity and orders C and D would be rested on the order book. In an alternative embodiment, the implied opportunity may not be distinguished from a real resting order resulting in the same result as with the first example. Where the implied opportunity to sell 5 units at 10 is resting in addition to the real order to sell 5 units at 10, the implied opportunity is disregarded and real order of 5 units gets executed against the aggressive order C for price 10.20. At that point there is nothing else to match based on reservation price and order A, partial order C and order D get forwarded to the matching engine on pure FIFO. A would match with the implied opportunity of 5 contracts. A would rest with 5 contracts, C would rest with 5 contracts, D would rest with 10 contracts.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components or modules discussed above, such as the processors 202 and 302, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for mitigating latency disparity between different client devices and an electronic data transaction processing system in which data items are transacted by a hardware matching processor that matches, as they are received, incoming electronic data transaction request messages, for one of the data items based on a set of transaction parameters, received from the different client devices over a data communication network with at least one other previously received but unsatisfied electronic data transaction request message counter thereto to at least partially satisfy one or both of the incoming electronic data transaction request messages or the at least one other previously received electronic data transaction request message, the system comprising:

an interval processor operative to determine an occurrence of a first event and a subsequent occurrence of a second event;

an incoming order receiver coupled with the interval processor and operative to receive a set of incoming electronic data transaction request messages, each including a set of transaction parameters which further includes a first parameter having a first value and a second parameter having a second value, and store the received set of incoming electronic data transaction request messages in a memory coupled with the incoming order receiver prior to forwarding the set of received incoming electronic data transaction request messages to the hardware matching processor;

an order identifier coupled with the incoming order receiver and operative to, upon the occurrence of the second event, identify a first subset of at least two of the stored incoming electronic data transaction request messages wherein values of at least a subset of the set of transaction parameters thereof, including the first parameter, are identical, and determine whether the hardware matching processor would match any of the first subset of stored incoming electronic data transaction request messages, based on the set of transaction parameters thereof, with at least one other previously received but unsatisfied electronic data transaction request message counter thereto to at least partially satisfy one or both of the stored incoming electronic data transaction request messages or the at least one other previously received electronic data transaction request message;

an order forwarder coupled with the order identifier and operative to, upon the occurrence of the second event, modify the first value of the first parameter of each of the first subset of the set of stored incoming electronic data transaction request messages based on the second value of the second parameter and determine at least one second subset thereof which would be matched by the hardware matching processor, based on the modified first values, with at least one other previously received but unsatisfied electronic data transaction request message counter thereto to at least partially satisfy one or both of the second subset of stored incoming electronic data transaction request messages or the at least one other previously received electronic data transaction request message, and forward each stored electronic data transaction request message of each of the at least one second subset, each having the modified first value, to the hardware matching processor in the order in which they were received by the incoming order receiver and, subsequent thereto, forward each remaining stored electronic data transaction request message of the first subset, each having their associated first set of transaction parameters, to the hardware matching processor in the order in which they were received by the incoming order receiver.

2. The system of claim 1 wherein the incoming electronic data transaction request messages may include a request to modify at least one other previously received electronic data transaction request message, the system further comprising:

an order modifier identifier coupled with the incoming order receiver and the order identifier and operative to, upon the occurrence of the second event and wherein it is determined that the hardware matching processor would match any of the first subset of stored incoming electronic data transaction request messages, based on the set of transaction parameters thereof, with at least one other previously received but unsatisfied electronic data transaction request message counter thereto to at least partially satisfy one or both of the stored incoming electronic data transaction request messages or the at least one other previously received electronic data transaction request message, identify and forward to the hardware matching processor any of the stored incoming electronic data transaction request messages comprising a request to modify any of at least one other previously received but unsatisfied electronic data transaction request messages to the extent those identified stored incoming electronic data transaction request messages comprising a request to modify any of at least one other previously received but unsatisfied electronic data transaction request messages would have been effective if at least all of the subset of stored incoming electronic data transaction request messages and the identified stored incoming electronic data transaction request messages comprising a request to modify any of at least one other previously received but unsatisfied electronic data transaction request messages were forwarded to the hardware matching processor in the order in which they were received by the incoming order receiver;

wherein the order identifier is further operative upon the occurrence of the second event and subsequent to the forwarding of any of the stored incoming electronic data transaction request messages comprising a request to modify any of at least one other previously received but unsatisfied electronic data transaction request messages, and wherein it is subsequently determined that the hardware matching processor would still match any of the first subset of stored incoming electronic data transaction request messages.

3. The system of claim 1 wherein the interval processor, incoming order receiver, order identifier and order forwarder are comprised by the hardware matching processor.

4. The system of claim 1 wherein the first and second events define an elapse of an interval of time.

5. The system of claim 4 wherein the time interval begins to elapse upon receipt of an incoming electronic data transaction request subsequent to a prior elapse of the time interval.

6. The system of claim 4 wherein the time interval begins to elapse upon transmission of notification of a previously received but not satisfied electronic data transaction request to the different client devices.

7. The system of claim 4 wherein the duration of the time interval is variable.

8. The system of claim 1 wherein the first event comprises receipt of an acknowledgment from the hardware matching processor acknowledging receipt of previously forwarded incoming orders.

9. The system of claim 1 wherein the second event comprises the number of stored received incoming orders exceeding a threshold.

10. The system of claim 1 wherein the received incoming electronic data transaction requests are stored in the memory in association with data indicative of time and/or order of receipt by the incoming order receiver.

11. A method for mitigating latency disparity between different client devices and an electronic data transaction processing system in which data items are transacted by a hardware matching processor that matches, as they are received, incoming electronic data transaction request messages, for one of the data items based on a set of transaction parameters, received from the different client devices over a data communication network with at least one other previously received but unsatisfied electronic data transaction request message counter thereto to at least partially satisfy one or both of the incoming electronic data transaction request messages or the at least one other previously received electronic data transaction request message, the method comprising:

determining, by an incoming order processor, an occurrence of a first event and a subsequent occurrence of a second event;

receiving, by the incoming order processor, a set of incoming electronic data transaction request messages, each including a set of transaction parameters which further includes a first parameter having a first value and a second parameter having a second value, and storing the received set of incoming electronic data transaction request messages in a memory coupled with the incoming order processor prior to forwarding the received incoming electronic data transaction request messages to the hardware matching processor;

identifying, by the incoming order processor, upon the occurrence of the second event, a first subset of at least two of the stored incoming electronic data transaction request messages wherein values of at least a subset of the set of transaction parameters thereof, including the first parameter, are identical, and determining whether the hardware matching processor would match any of the first subset of stored incoming electronic data transaction request messages, based on the set of transaction parameters thereof, with at least one other previously received but unsatisfied electronic data transaction request message counter thereto to at least partially satisfy one or both of the stored incoming electronic data transaction request messages or the at least one other previously received electronic data transaction request message;

modifying, by the incoming order processor, upon the occurrence of the second event, the first value of the first parameter of each of the first subset of the set of stored incoming electronic data transaction request messages based on the second value of the second parameter and determining at least one second subset thereof which would be matched by the hardware matching processor, based on the modified first values, with at least one other previously received but unsatisfied electronic data transaction request message counter thereto to at least partially satisfy one or both of the second subset of stored incoming electronic data transaction request messages or the at least one other previously received electronic data transaction request message, and forwarding each stored electronic data transaction request message of each of the at least one second subset, each having the modified first value, to the hardware matching processor in the order in which they were received by the incoming order processor and, subsequent thereto, forward each remaining stored electronic data transaction request message of the first subset, each having their associated first set of transaction parameters, to the hardware matching processor in the order in which they were received by the incoming order processor.

12. The method of claim 11 wherein the incoming electronic data transaction request messages may include a request to modify at least one other previously received electronic data transaction request message, the method further comprising:

identifying and forwarding, upon the occurrence of the second event and wherein it is determined that the hardware matching processor would match any of the first subset of stored incoming electronic data transaction request messages, based on the set of transaction parameters thereof, with at least one other previously received but unsatisfied electronic data transaction request message counter thereto to at least partially satisfy one or both of the stored incoming electronic data transaction request messages or the at least one other previously received electronic data transaction request message, to the hardware matching processor any of the stored incoming electronic data transaction request messages comprising a request to modify any of at least one other previously received but unsatisfied electronic data transaction request messages to the extent those identified stored incoming electronic data transaction request messages comprising a request to modify any of at least one other previously received but unsatisfied electronic data transaction request messages would have been effective if at least all of the subset of stored incoming electronic data transaction request messages and the identified stored incoming electronic data transaction request messages comprising a request to modify any of at least one other previously received but unsatisfied electronic data transaction request messages were forwarded to the hardware matching processor in the order in which they were received by the incoming order processor;

wherein the modifying is further subject to the occurrence of the second event and subsequent to the forwarding of any of the stored incoming electronic data transaction request messages comprising a request to modify any of at least one other previously received but unsatisfied electronic data transaction request messages, and wherein it is subsequently determined that the hardware matching processor would still match any of the first subset of stored incoming electronic data transaction request messages.

13. The method of claim 11 wherein the determining, receiving, identifying, modifying and forwarding are performed by the hardware matching processor.

14. The method of claim 11 wherein the first and second events define an elapse of an interval of time.

15. The method of claim 14 wherein the time interval begins to elapse upon receipt of an incoming electronic data transaction request subsequent to a prior elapse of the time interval.

16. The method of claim 14 wherein the time interval begins to elapse upon transmission of notification of a previously received but not satisfied electronic data transaction request to the different client devices.

17. The method of claim 14 wherein the duration of the time interval is variable.

18. The method of claim 11 wherein the first event comprises receipt of an acknowledgment from the hardware matching processor acknowledging receipt of previously forwarded incoming orders.

19. The method of claim 11 wherein the second event comprises the number of stored received incoming orders exceeding a threshold.

20. The method of claim 11 wherein the received incoming electronic data transaction requests are stored in the memory in association with data indicative of time and/or order of receipt.

* * * * *